United States Patent [19]

Ditlinger

[11] 4,208,952
[45] Jun. 24, 1980

[54] PISTON WITH EXTENDED AXIAL TRAVEL

[75] Inventor: Richard J. Ditlinger, South Bend, Ind.

[73] Assignee: The Bendix Corporation, Southfield, Mich.

[21] Appl. No.: 908,188

[22] Filed: May 22, 1978

Related U.S. Application Data

[63] Continuation-in-part of Ser. No. 754,134, Dec. 27, 1976, abandoned.

[51] Int. Cl.² ............................................... F01B 9/02
[52] U.S. Cl. ................................... 92/13; 92/13.1;
92/13.6; 92/51; 92/117 A; 92/165 PR;
188/71.8; 188/196 A
[58] Field of Search ................... 92/51, 13.1, 13.6, 62,
92/117 A, 13, 53, 108, 165 PR; 91/167 R;
188/71.8, 196 A

[56] References Cited

U.S. PATENT DOCUMENTS

| | | | |
|---|---|---|---|
| 3,335,642 | 8/1967 | Rosaen | 92/110 |
| 3,729,072 | 4/1973 | Borkowski | 188/71.8 |
| 3,995,721 | 12/1976 | Chambers | 92/51 |
| 4,006,669 | 2/1977 | Price | 92/51 |
| 4,068,746 | 1/1978 | Munechika | 188/196 A |

*Primary Examiner*—Abraham Hershkovitz
*Attorney, Agent, or Firm*—Leo H. McCormick, Jr.; Ken C. Decker

[57] ABSTRACT

A fluid pressure actuated piston is slidably carried in a fluid pressure actuated cylinder which, in turn, is slidably carried in a fixed carrier. Forward axial movement of the cylinder is restricted by a hydraulic pressure balance condition which is created by reducing the rearward surface area of the cylinder. The cylinder is maintained in a pressure balanced condition during the entire operation of the piston assembly. After the piston moves axially forward a predetermined distance, it engages the cylinder and urges the cyliner axially forward the same distance traveled by the piston. The piston's maximum axial movement is thereby extended by the distance the cylinder travels. The output force of the piston is substantially unaffected by the force imposed on the cylinder. Also, the cylinder does not provide any work force area.

8 Claims, 2 Drawing Figures

PISTON WITH EXTENDED AXIAL TRAVEL

This is a continuation-in-part of application Ser. No. 754,134, filed Dec. 27, 1976, now abandoned.

BACKGROUND OF THE INVENTION

The present invention relates to fluid pressure actuated force pistons having an extended range of travel. Reference is made to U.S. Pat. Nos. 3,789,738; 3,887,042; 3,915,063; 3,995,721 and 4,006,669, all of which are assigned to the assignee of the present invention for generally similar type piston and extensible cylinder apparatus wherein the present invention is an improvement thereover.

Prior art arrangements which extend the axial travel of aircraft brake piston assemblies and thereby reduce the piston cavity depth, have been somewhat complicated and consist of a number of small parts that pose problems in installation. The current development of aircraft brake assemblies utilizing carbon friction material indicate that pistons with longer axial travel will be necessary in order to utilize the full range of the frictional material. It is not desirable to make longer axial length pistons because this substantially increases the weight and depth of the piston cavity. Increasing the cavity depth has practical problems due to the wheel designs such that they will become more susceptible to external damage. Also, some prior art designs also affect the brake pressure "feel" to the aircraft pilot by either requiring more fluid or increasing the piston work force area.

SUMMARY OF THE INVENTION

The present invention provides a fluid pressure actuated piston with extended axial travel and simple construction, having only two moving parts. The increased piston travel is obtained by use of a floating cylinder liner that is hydraulically balanced during the entire travel of the piston. At approximately one half of the piston working stroke the piston engages the cylinder and continues to urge it forward thereby extending the travel of the piston.

It is an object of the present invention to provide an extensible piston assembly that creates a pressure balance condition on the extending cylinder liner without the use of pressure amplifier means.

Another object is to provide an extensible piston assembly that does not materially affect the brake "feel" to the aircraft pilot at either the transition point extending the cylinder or by changing the piston work force area.

DESCRIPTION OF THE PREFERRED EMBODIMENT

Figure 1:
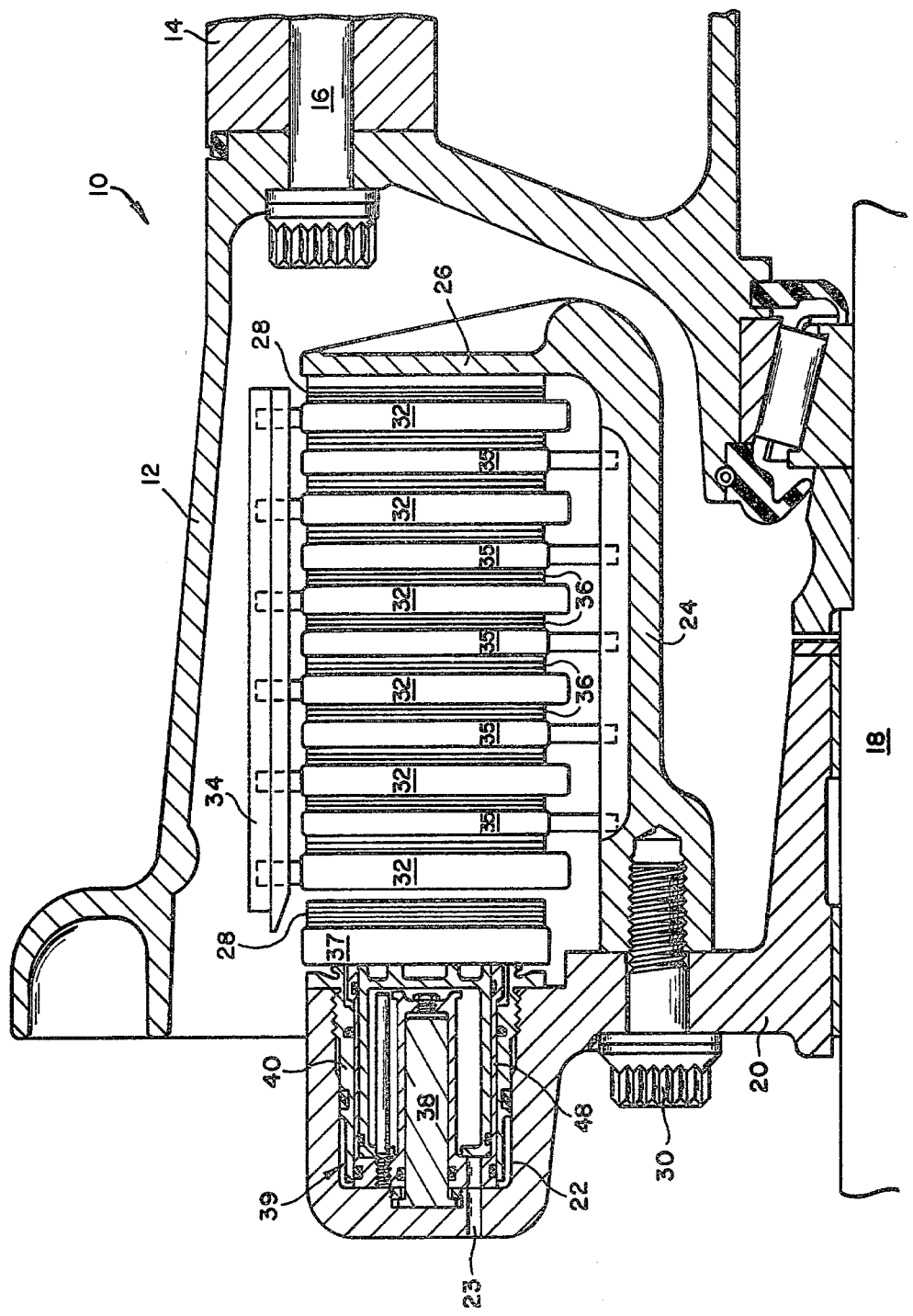
FIG. 1 is a sectional schematic representation of a conventional aircraft wheel and disc brake assembly embodying the piston assembly of the present invention.
Figure 2:
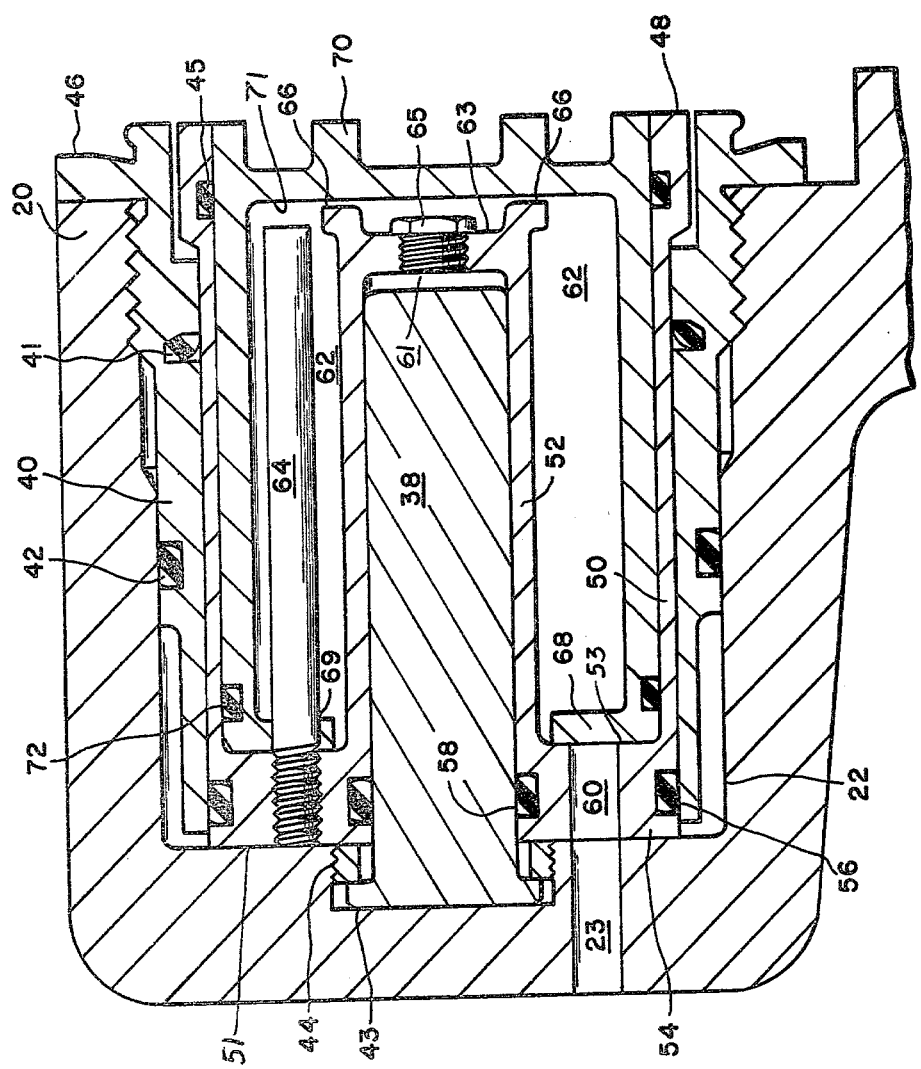
FIG. 2 is a sectional view of the piston assembly of the present invention shown in enlarged form and removed from the wheel and disc brake of FIG. 1.

Referring to FIGS. 1 and 2, numeral 10 designates an aircraft wheel and multiple disc brake assembly. The wheel is defined by two annular sections 12 and 14, only one of which is fully shown, fastened together by circumferentially spaced-apart bolts and nuts generally indicated by 16. The wheel is suitably journaled on a rotatably fixed axle 18 carried by conventional aircraft landing gear structure, not shown. An annular brake carrier 20 keyed to axle 18 is provided with a plurality of circumferentially spaced-apart cavities 22, only one of which is shown, vented via passage 23 to a source of pressurized fluid, not shown, controlled by the aircraft pilot. A torque tube 24 having an integral backing plate 26 lined with friction material 28 is fixedly secured to carrier 20 by a plurality of circumferentially spaced-apart bolts 30. A plurality of spaced-apart annular brake rotor members 32 are keyed to a retaining member 34 fixedly secured to wheel section 12. A plurality of annular brake stator members 35 having friction lining 36 secured to opposite faces thereof are keyed for axial movement to torque tube 24. A pressure plate 37 keyed for axial movement to torque tube 24 and, like backing plate 26, provided with lining 28, is adapted to be actuated by a plurality of piston means generally indicated by 29, disposed in cavities 22. Upon energization of the piston means 39, the pressure plate 37 is urged toward backing plate 26 thereby compressing the stacked stators 35 and rotors 32 together to retard rotation of wheel sections 12 and 14.

The cavities 22 are each provided with a sleeve 40 threadedly engaged with carrier 20. Sleeve 40 is provided with an annular recess containing an "O" ring or similar suitable fluid seal 42 as well as having a flange portion 46 adapted to be engaged by suitable wrench means, not shown, for assembly and disassembly purposes. Conventional dust wiper seal 41 is secured in sleeve 40 and serves to prevent dirt or debris from entering the slidably engaged surfaces of sleeve 40 and liner 48.

A center post 38 has a larger diameter at the inner end 43 to enable it to be loosely secured in carrier 20 by recessed nut 44. Although many other means of securing center post 38 to carrier 20 are possible, this method allows some movement of the center post to minimize concentricity problems with assembly of the piston. The center post 38 is positioned in the center of cavity 22 with its axial center coinciding with the axial center of cavity 22.

A floating liner generally indicated as 48 is composed of two spaced-apart concentric cylinders 50 and 52 which are fixedly secured to end wall 54 to maintain their spaced-apart relationship. Many means of securing them to the end wall are possible but the preferred embodiment depicts cylinders 50 and 52 integral with end wall 54. End wall 54 is specially adapted to be slidably engaged with both sleeve 40 and center post 38. The cylinder surfaces of end wall 54 so slidably engaged with sleeve 40 and center post 38 are provided with annular recesses containing an "O" ring or similar suitable fluid seals 56 and 58, respectively. Also, conventional dust wiper seal 45 is secured in liner 48 to prevent dust or debris from entering the slidably engaged surfaces of cylinder 50 and piston 70. Cylinder 50 is secured to end wall 54 so as to form a continuous slidable engagement with sleeve 40 and cylinder 52 is secured to end wall 54 so as to form a continuous slidable engagement with center post 38. End wall 54 has a fluid passage 60 that allows pressurized fluid to flow from passage 23 through end wall 54 into area 62 of cavity 22. End wall 54 is threadedly adapted to receive guide rod 64 which serves to align piston 70 and cylinder 48. Cylinder 52 has an end wall 63 at the end opposite that of end wall 54. End wall 63 has a plurality of tangs 66 that extend radially outward and are adapted to engage tangs 68 of piston 70. End wall 63 also has a screw 65 which is removed during installation of liner 48. If screw 65 is not removed during installation, the trapped air would be compressed and develop a pressure to prevent complete installation of the liner 48 on post 38 since seal 58 prevents fluid or air from flowing between chamber 61 and 62.

A cup-shaped piston 70 is slidably engaged with the inner cylindrical surface of cylinder 52 of floating liner 48 with the closed end bearing against the pressure plate 37. Piston 70 is suitably recessed to receive an annular "O" ring or suitable similar fluid seal 72 which resists fluid leakage between adjacent surfaces of piston 70 and cylinder 52. The inward open end of the piston has a plurality of radially inward tangs 68 which extend inward a sufficient distance to engage tangs 66 of the floating liner during operation of the piston assembly. In order for the plurality of tangs 66 to be engaged by tangs 68, guide rod 64 is inserted through a hole in one of the piston tangs 68 as shown at 69 and is slidably engaged with the tang. The guide rod 64 thereby insures proper alignment of piston 70 is fully extended tangs 68 will engage tangs 66.

Assuming that the brake apparatus embodying the present invention is in position as shown in FIG. 1, a brake application by the aircraft pilot results in pressurization of the fluid supplied to cavities 22 and subsequent pressurization of pistons 70 which move forward, away from the respective end wall 54 of liner 48 thereby forcing pressure plate 37 toward backing plate 26 to compress rotor members 32 and stator members 35 together to produce the desired braking action of wheel sections 12 and 14.

In FIG. 2 it appears that fluid passage 60 is blocked by tang 68; however, in actuality, tang 68 is slightly offset from the fluid passage and area 62 is completely filled with fluid. The pressurized fluid forces piston 70 outward because of the forward hydraulic force against the inside surface area 71 of the piston cup. The force acting against the tangs is negligible.

Upon depressurization of pistons 70 to release the brake, the pressure plate 37 and thus pistons 70 bearing thereagainst are retracted under the influence of a plurality of brake adjusting and retraction units, not shown, connected to pressure plate 37 and carrier 20. Reference is made to U.S. Pat. No. 3,887,047 in the name of E. E. Harnish et al. and assigned to the assignee of the present application for an example of suitable adjusting and retraction units of the above-mentioned type. It will be understood that the brake adjusting and retraction units, not shown, serve to automatically axially advance the pressure plate 37 to compensate for wear of the friction material 28 and 36 and retract the pressure plate 37 axially a predetermined distance to establish a corresponding predetermined brake running clearance upon release of the brake.

Assuming that repeated brake applications in the above-mentioned manner have occurred causing the friction material 28 and 30 to wear accordingly, each piston 70 will be required to advance axially to a progressively greater extent relative to the cylinder 48 to compensate for the brake wear. If the cylinder 48 was held in the retracted position shown, the piston 70 would be limited to the travel established by the distance between tangs 66 and tangs 68, which travel may be insufficient to compensate for remaining wear of the friction material 28 and 30.

To extend the range of travel of piston 70 the liner 48 is adapted to be urged axially by piston 70. The liner 48 is hydraulically balanced due to the effect of center post 38 which subtracts hydraulic area from the rearward surface 51 of end wall 54. Because fluid is always acting on each side 51, 53 of end wall 54 of liner 48 it is not moved hydraulically; surface area 51 equals surface area 53 plus 63. Liner 48 moves forward axially only when tangs 68 of piston 70 engage tangs 66 and only the amount needed for the piston 70 to properly engage the rotor members 32 and stator members 35, which depends upon the wear of the frictional linings 28, 36. It should be noted that movement of liner 48 is not hampered by vacuum created in chamber 61 since the pressurre differential across surface 63 as compared to surface 51 is negligible, i.e., normal operational fluid pressure is between 3000 to 4000 psi and the maximum vacuum which could be created would be 14.7 psi less.

It is interesting to note that the present invention has no transition point to affect the brake "feel" experienced by the aircraft operator because there is no secondary cavity to refill at a given extension point and the braking force always is applied from the same piston. The liner 48 merely floats with the piston at any given extension to maintain the hydraulic seal beyond the initial travel length of piston 70.

Another novel feature of the present invention occurs upon depressurization of piston 70 when the cylinder 48 is in an extended position. As described earlier, upon depressurization the pressure plate 37 is moved by a retraction mechanism such as described in U.S. Pat. No. 3,887,047 to return piston 70 a predetermined distance to a retracted idle position. Except for some friction imparted by the fluid seal 72 between the piston 70 and liner 48 which will cause slight rearward movement of cylinder 48 due to the rearward movement of piston 70 should any fluid flow past seal 58 from chamber 62 into chamber 61, a fluid lock could be created and would aid in holding piston 48 in the extended position. The fluid in chamber 61 would not move sleeve 48 and fluid under pressure acting on end wall 63 would cancel each other. In addition, such a fluid lock would not affect the operation of piston 70 since its effective stroke is equal to the distance between tangs 66 and end wall 53. By design, the effective stroke is somewhat less than the running clearance set by the retraction mechanism in U.S. Pat. No. 3,887,047 and the distance moved by the piston to create a maximum brake torque.

The sleeve 40 can be eliminated so that the liner 48 can slidably engage the carrier cavity 22 surface.

I claim:

1. Fluid pressure actuated piston assembly with extended travel comprising:

a casing having a cavity therein;

cylinder means slidably disposed within said cavity and responsive to a pressurized fluid supplied to said cavity, said cylinder means having a first end wall with front and rear annular surface areas exposed to said pressurized fluid, and first and second spaced-apart coaxial cylinders connected to said first end wall, said second cylinder having a second end wall;

a first guide rod carried by said casing and projected through a hole in said first end wall for reducing the amount of rear annular surface area of said first end wall so as to hydraullically balance the axial movement of said cylinder means inside said cavity;

a piston slidably retained in said first cylinder and responsive to said pressurized fluid in said cavity;

first and second shoulder means carried by said second cylinder and said piston, respectively, so as to be engaged with each other when said piston travels a predetermined forward axial distance, wherein continued forward axial travel of said piston after engagement of said first and second shoulder means thereby acts to pull said cylinder means axially forward a distance equal to the distance said piston travels beyond said predetermined axial distance; and a second guide rod attached to said first end wall for engaging said piston to maintain said first and second shoulder means in angular alignment and thereby assure the engagement therebetween on said predetermined forward axial movement.

2. A fluid pressure actuated piston assembly with extended travel, as claimed in claim 1, wherein said first and second shoulder means comprise:

a plurality of annular circumferentially spaced-apart first tangs, carried by said second cylinder; and a plurality of annular, circumferentially spaced-apart second tangs carried by said piston, with said circumferential spacing of said first and second tangs being identical.

3. A fluid pressure actuated piston assembly with extended travel, as claimed in claim 1, including:

a cavity liner member secured to said cavity, said cavity liner member slidably engaging said first cylinder.

4. The fluid pressure actuated piston assembly as recited in claim 1 further including:

fastener means through which said first guide rod is secured to said casing to permit limited adjustment whereby said piston is concentrically positioned with respect to said first cylinder.

5. A fluid pressure actuated piston assembly with extended travel comprising:

a casing with an open end and a closed end defining a cavity therein;

means for communicating a pressurized fluid to said cavity;

cylinder means disposed in said cavity, said cylinder means being axially slidble between an initial retracted and extended position toward said closed and open ends of said casing, respectively, said cylinder means having first and second fluid pressure responsive surface areas facing said closed and open ends, respectively;

area means disposed in said cavity for reducing the amount of said first surface area exposed to said pressurized fluid thereby making the effective first and second fluid pressure responsive surface areas equal;

a piston member responsive to said pressurized fluid and contained by said first cylinder, said piston member being axially slidable therewithin between retracted and extended positions toward said closed and open ends of said casing, respectively;

coupling means for coupling on said cylinder means and said piston member respectively, said cylinder means for extended axial movement with said piston member when said piston member reaches a predetermined extended axial position whereupon continued axial extension of said piston member urges said cylinder means axially to extend its said position the same amount said piston member axially extends beyond said predetermined axial position;

said cylinder means including spaced-apart inner and outer cylinder members slidably containing said area means and said piston member, respectively;

said inner cylinder member having a first annular wall sealing off an inner portion of said inner cylinder member from pressurized fluid, said first annular wall providing a third fluid pressure responsive surface area;

a second annular wall extending radially inwardly from said outer cylinder member into engagement with said inner cylinder member, said second annular wall being fixed to said inner and outer cylinder members to maintain said spaced-apart relationship, said second annular wall having differential fluid pressure responsive surface areas that, in combination with said first annular wall define said first and second fluid pressure responsive surface areas;

said area means including a post member disposed in said cavity and operatively secured to said casing to maintain a fixed axial relationship to said cavity, said post member being received within said inner portion of said inner cylinder member; and a guide rod attached to said second annular wall for engaging said piston member to maintain said coupling means on said cylinder means in angular alignment with the coupling means on said piston member and thereby assure the engagement therebetween on movement beyond said predetermined axial position.

6. A fluid pressure actuated piston assembly with extended travel, as claimed in claim 5 wherein said coupling means comprises:

first and second shoulder means carried by said cylinder means and said piston member, respectively, so as to be engaged with each other when said piston extends a predetermined axial distance, wherein continued axial extension of said piston member after engagement of said first and second shoulder means thereby pulls said cylinder means axially a distance equal to the distance said piston member travels beyond said predetermined axial distance.

7. The fluid pressure actuated piston assembly as recited in claim 5 further including:

fastener means through which said post member is connected to said casing, said fastener means being adjustable to assure that said piston member is axially aligned with said cylindrical means.

8. A fluid pressure actuated piston assembly with extended travel comprising:

a housing having a cavity therein;

liner means located in said cavity having a first end wall with front and rear surfaces exposed to pressurized fluid supplied to said cavity, said liner means having first and second spaced-apart cylinders connected to said first end wall, said liner means having a second end wall connected to the end of said second cylinder;

a first guide rod connected to said housing and projecting through said first end wall into the interior of said second cylinder for reducing the area of said rear surface exposed to the pressurized fluid to hydraulically balance the axial movement of said liner means in said cavity;

a piston located in said cavity and cooperating with said first cylinder, said first and second end walls, and said second cylinder to define a chamber, said first end wall having a passage therethrough to connect said chamber with said source of pressurized fluid;

first and second shoulder means extending from said piston and said second cylinder, respectively, so as to engage each other when said piston travels a predetermined forward axial distance in response to pressurized fluid in said cavity, wherein continued forward axial travel of said piston after engagement of said first and second shoulder means thereby acts to pull said liner means axially forward a distance equal to the distance said piston travels beyond said predetermined axial distance; and a second guide rod carried by said first end wall, with said second guide rod projected through a hole in said first shoulder and adapted to be slidably engaged therewith to fix the angular position of said piston to said first end wall so that said first shoulder of said piston engages said second cylinder after said piston travels a predetermined forward axial distance.

* * * * *